United States Patent
Madsen et al.

(10) Patent No.: US 8,656,693 B2
(45) Date of Patent: Feb. 25, 2014

(54) FILLING DEGREE GAUGE, AGRICULTURAL VEHICLE WITH THE GAUGE, AND METHOD OF MEASURING AND DISPLAYING RESIDUAL FILLING POTENTIAL OF TARGET AREA

(75) Inventors: Tommy Ertbolle Madsen, Virum (DK);
Morten Rufus Blas, Copenhagen (DK);
Kristian Kirk, Helsingen (DK)

(73) Assignee: CLAAS Agrosystems KGaA mbH & Co. KG, Guetersloh (DE)

( * ) Notice: Subject to any disclaimer, the term of this patent is extended or adjusted under 35 U.S.C. 154(b) by 627 days.

(21) Appl. No.: 12/868,856

(22) Filed: Aug. 26, 2010

(65) Prior Publication Data

US 2011/0061762 A1   Mar. 17, 2011

(30) Foreign Application Priority Data

Sep. 7, 2009   (EP) .................................... 09169622
Sep. 21, 2009  (EP) .................................... 09170842

(51) Int. Cl.
*A01D 41/127* (2006.01)
*G06F 19/00* (2011.01)
*G09G 5/00* (2006.01)
*B65B 1/04* (2006.01)
*B65G 67/22* (2006.01)

(52) U.S. Cl.
USPC .......... 56/10.2 R; 701/50; 340/612; 345/632; 141/1; 141/95; 141/98; 141/231

(58) Field of Classification Search
USPC .......... 141/1, 94–95, 83, 98, 231; 56/10.2 R, 56/DIG. 15; 701/50; 340/500; 460/114; 345/632
See application file for complete search history.

(56) References Cited

U.S. PATENT DOCUMENTS

| | | | |
|---|---|---|---|
| 5,575,316 A | | 11/1996 | Pollklas |
| 6,097,425 A | * | 8/2000 | Behnke et al. ................ 348/89 |
| 6,118,427 A | * | 9/2000 | Buxton et al. ............... 345/629 |
| 7,309,048 B2 | * | 12/2007 | von Thal et al. ......... 244/135 A |
| 8,234,047 B2 | * | 7/2012 | Madsen et al. ................. 701/50 |
| 2009/0044505 A1 | * | 2/2009 | Huster et al. .............. 56/10.2 R |

FOREIGN PATENT DOCUMENTS

| | | |
|---|---|---|
| DE | 44 26 059 | 2/1996 |
| EP | 1 344 445 | 9/2003 |
| EP | 2 020 174 | 2/2009 |

* cited by examiner

*Primary Examiner* — Timothy L Maust
*Assistant Examiner* — Timothy P Kelly
(74) *Attorney, Agent, or Firm* — Michael J. Striker

(57) ABSTRACT

A filling degree gauge for measuring and displaying a residual filling potential of a target area, such as a container, being filled through a target, such as an open top, with goods by a goods carrier, such as a discharge spout, of an agricultural vehicle, such as a harvester, has a 3D sensor for observing at least a part of the target area including at least a part of the target, a data control system and a visual display unit. The data control system operates to provide on the visual display unit a visual display indicating residual filling potential by indicating the current one of at least three different levels of residual filling potential.

20 Claims, 6 Drawing Sheets

FILLING DEGREE GAUGE, AGRICULTURAL VEHICLE WITH THE GAUGE, AND METHOD OF MEASURING AND DISPLAYING RESIDUAL FILLING POTENTIAL OF TARGET AREA

CROSS-REFERENCE TO RELATED APPLICATION

The invention described and claimed hereinbelow is also described in European Patent Applications EP 09170842.0 filed on Sep. 21, 2009 and EP 09169622.9 filed on Sep. 7, 2009. These European Patent Applications, whose subject matter is incorporated here by reference, provide the basis for a claim of priority of invention under 35 U.S.C. 119(a)-(d).

The present application contains a subject matter which can be similar to the subject matter disclosed in U.S. patent application Ser. No. 12/868,885 filed Aug. 26, 2010.

BACKGROUND OF THE INVENTION

The present invention relates a filling degree gauge for measuring and displaying a residual filling potential of a target area being filled through a target with goods by means of a goods carrier of an agricultural vehicle, especially a discharge spout of a forage harvester.

The invention further relates to an agricultural vehicle comprising a filling degree gauge and a method of controlling filling of a target area, especially an open top container.

In agriculture, as in most businesses, efforts are being made to ensure efficient production. E.g. during harvest efforts are made to ensure quick harvest by providing advanced machines being able to run at a high speed and having a large working width. Further efforts are being made to ensure safe transfer of harvested goods to transport vehicles for transporting the goods from the field. The advanced and fast machines are demanding of control and would lay a heavy burden on their operators if not for automation. Efforts are made to automate harvesting completely, but meanwhile an operator (i.e. a human) performs a number of steering and controlling operations and monitors other operations. In order not to stress the operator or driver unnecessarily monitoring means should be available that facilitate the monitoring as far as possible.

Regarding monitoring transfer of goods to a container during harvest examples of prior art is given below:

DE-A-44 26 059 suggests providing a video camera watching the container and providing a monitor in the driver's cab allowing the driver to watch the loading of the container. Software may be used to recognise the upper edge, i.e. the opening, of the container and keep a spout aimed at the opening.

U.S. Pat. No. 5,575,316 suggests providing a harvester with an optical and/or acoustic range finder for measuring a container to be loaded and measuring the fill levels in the container for automatic filling the container. The control operates an optical or acoustic display when the container has been filled to a certain extend, and other acoustic or optical displays and warning devices are provided. Thus it is suggested to survey the degree of filling, but without transferring the knowledge thereof to a human operator.

U.S. Pat. No. 6,097,425 suggests using a three-dimensionally operating video camera, e.g. an infrared camera, and providing a monitor in the driver's cab, and to show on the monitor the contour of the upper opening of a container to be loaded, the corners of the opening,
the point of impact of a stream of goods being loaded into the container,
indications of suggested control operations for redirecting the stream of goods, and
a working signal further provided with an acoustic alarm for warning about loss.

EP-A-1 344 445 suggests providing a video camera watching a container and providing a monitor in the driver's cab allowing the driver to watch the container during loading. It is suggested to process the image shown on the monitor to optimise its contrast and brightness and it is suggested to provide the image with overlay data such as pointers and text messages.

EP-A-2 020 174 suggests providing a control system with a 3D-camera watching a container to be loaded with goods, the camera and attached software providing for determining positions of the walls of the container, the filling height horizon and characteristic lines and orientation points of the upper side of the container comprising the opening thereof. The purpose of the control system is to relieve the operator as far as possible of the task of monitoring a transfer process. It is suggested to show on a monitor a video sequence showing the container and visualising the filling height horizon and the sidewalls. It is also suggested that critical conditions are indicated by a graphic warning signal. It is thus suggested to show to an operator the filling height horizon, but it demands attention and consideration of the operator to establish the filling degree or the residual filling potential from the filling height horizon. Further it is known to give a warning signal to the operator in critical situations, but not until such situations have actually arisen.

SUMMARY OF THE INVENTION

In view of this prior art it is an object of the present invention to facilitate further the possibilities of a human operator of an agricultural vehicle of monitoring the process of filling a target area, such as a container, through a target, such as an open top of the container, and relieve the operator of stress.

This is obtained by providing a filling degree gauge for measuring and displaying a residual filling potential of a target area being filled through a target with goods by means of a goods carrier of an agricultural vehicle, especially a discharge spout of a forage harvester, said filling degree gauge comprising a 3D sensor for observing at least a part of the target area including at least a part of the target, a data control system and a visual display unit, said data control system operating to provide on the visual display unit a visual display indicating residual filling potential by indicating the current one of at least three different levels of residual filling potential. Hereby is obtained that the operator readily may realize the state of filling of the target area, without being stressed because the target area is suddenly full.

Preferably the data control system comprises a data processor and a memory, and the 3D sensor may comprise any suited sensor such as a stereo camera, a 3D imaging device based on the time-of-flight principle, a laser scanning device or an ultra sonic scanning devise, etc.

The data control system preferably operates to provide on the visual display unit a visual display indicating local residual filling potential for at least two local areas. Hereby is obtained that it is possible for the operator to monitor the gradually filling of different areas of the target area.

In one embodiment the local areas are fixed relative to the 3D sensor. Hereby is obtained that the operator may readily realize how the goods carrier should be moved relative to the target area and when.

In another embodiment the local areas are fixed relative to the target area. Hereby the operator may readily have an overview of the state of filling the different areas of the target area.

In a further embodiment the local areas and boundaries thereof are floating in dependence on levels of residual filling potential. Hereby the operator may readily realize which area has a given residual filling potential.

In a preferred embodiment the data control system operates to provide on the visual display unit a visual display indicating said at least three different levels of residual filling potential as "large", "small" and "none". Hereby a "large" residual filling potential means that for a good while attention may not be needed regarding the filling of the target area, "none" residual filling potential means that (locally) the target area is full, and filling (of that local area) should be terminated, while a "small" residual filling potential means that within a short time (locally) the target area will be full. Thus the operator is gradually warned. More that three different levels of residual filling potential may be used, e.g. an infinite number of different levels thus providing the indication of the visual display as a continuous function of the actual residual filling potential.

Conveniently the data control system operates to provide on the visual display unit a visual display indicating the different levels of residual filling potential by different colors. Hereby is obtained that the operator readily distinguishes the indications of the different levels of residual filling potential. Thus, preferably the data control system operates to provide on the visual display unit a visual display in which for a given local area, a color indicating the level of residual filling potential is changed, when the level of residual filling potential changes for that local area.

In a preferred embodiment the data control system operates to provide on the visual display unit a visual display indicating the local residual filling potential as a 2D graph. In one embodiment the data control system operates to provide on the visual display unit a visual display indicating said 2D graph in a 2D coordinate system in which one axis represents position in the target area and another axis represents filling degree, and in an alternative or supplementary embodiment the data control system operates to provide on the visual display unit a visual display indicating at least a part of the target area and the level of residual filling potential of local areas within said part of the target area, preferably by indicating mean local residual filling potential for parallel bands of the target area. Hereby the operator may readily obtain an overview of the overall filling status of the target area.

In a preferred embodiment an imaging device is provided for imaging at least a part of the target area including at least a part of the target, and the data control system operates to display an image provided by the imaging device on the visual display unit together with the visual display indicating residual filling potential. Preferably one of the displayed image and the visual display indicating residual filling potential is superposed on the other, whereby preferably the superposed display is transparent. Hereby the operator's perception of the filling state of the target area is facilitated since the operator is able to observe a picture of the target area as well as the indication of the measured residual filling potential.

The imaging device may be a separate device or it may be constituted by the 3D sensor, e.g. if the latter is a stereo camera or a 3D imaging device based on the time-of-flight principle.

In one embodiment the transparency of the superposed display is adjusted to indicate residual filling potential. Hereby the adjustment of the transparency of the superposed display may be local to indicate the residual filling potential of the corresponding local area of the target area.

Alternatively or additionally to the 2 above mentioned 2D representation of the residual filling potential, a 3D representation may be provided operating the data control system to provide on the visual display unit a visual display indicating two-dimensionally the target area, or the target, and indicating for local areas within said two dimensions the residual filling potential as a third dimension. The division of the target area, or the target, into local areas may be more or less coarse ranging from e.g. a 2×2 grid to pixel-level.

Correspondingly the object is obtained by means of an agricultural vehicle comprising a goods carrier for conveying goods to a target area said vehicle comprising a filling degree gauge according to the present invention.

Further the object is correspondingly obtained by means of a method of controlling filling of a target area, especially an open top container, with goods, whereby at least a part of the target area including at least a part of a target is observed by a 3D sensor, data thus obtained by the 3D sensor is processed by a data control system and said data control system operates to provide on a visual display unit a visual display indicating residual filling potential of the target area by indicating the current one of at least three different levels of residual filling potential.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
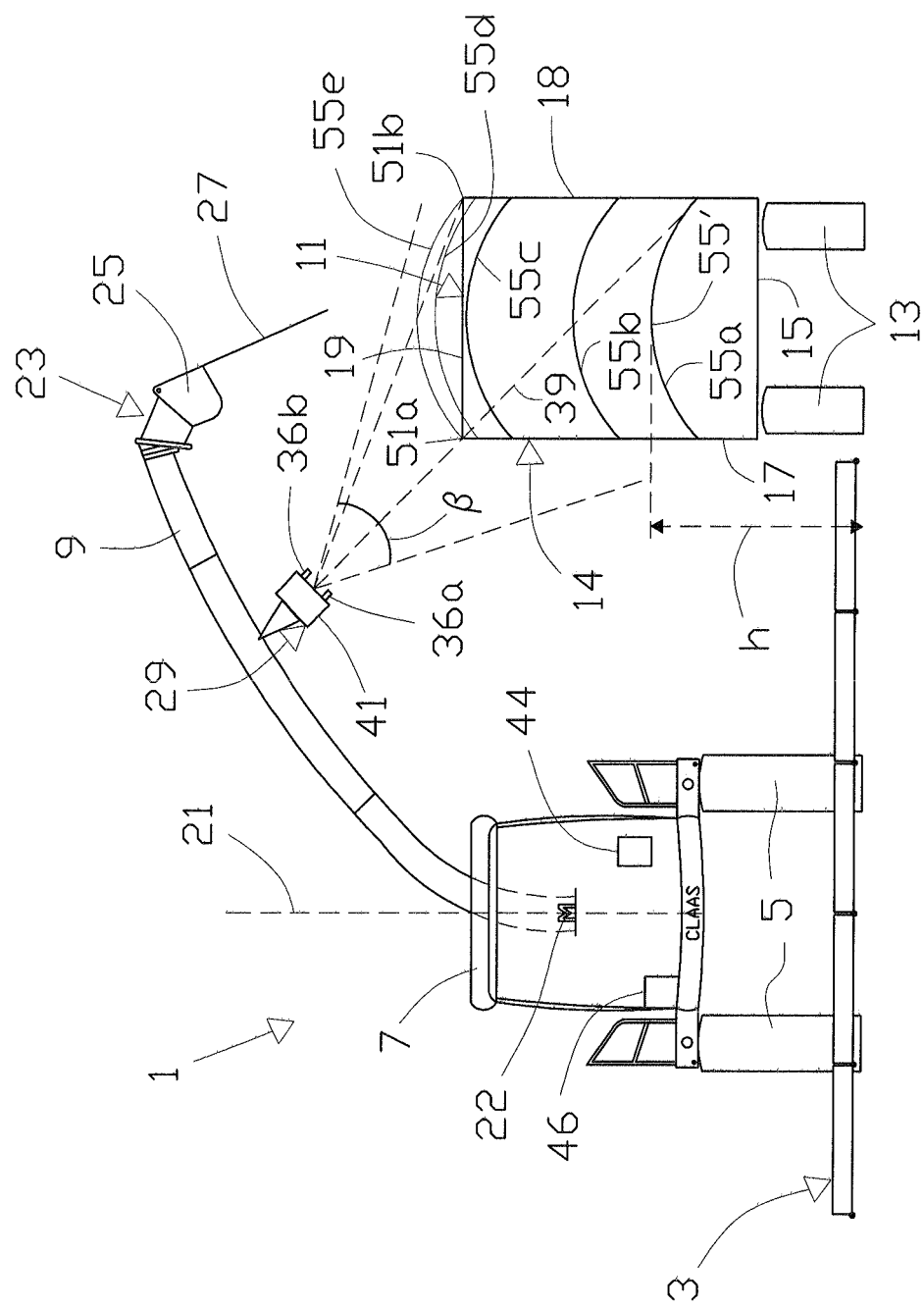
FIG. 1 shows a forage harvester and a transport wagon.

FIG. 1 shows in a front view a forage harvester 1 with a header 3, ground wheels 5, a driver's cabin 7 and a goods carrier in the form of a discharge or ejecting spout 9. During work the header 3 will harvest a crop, which is processed by the harvester 1 and ejected from the spout 9. To collect the ejected crop a transport wagon 11 is driven alongside the forage harvester 1. Of the transport wagon 11 only ground wheels 13 and a crop-carrying container 14 with a bottom 15, sidewalls 17, 18 and an open top 19, is shown in FIG. 1. Thus during operation the crop-carrying container 14 constitutes a target area to be filled with goods or crop and the open top 19 constitutes a target through which the goods must enter the target area.

The spout 9 is in a manner known per se mounted on the harvester 1 to be rotatable in a controlled manner around a vertical axis 21 by means of actuators indicated by numeral 22. A gauge is attached to the actuator 22, whereby the position of the spout 9 relative to the harvester 1 is known. The spout 9 is elongated and has an outer end 23 provided with an adjustable hood 25 for directing a crop stream 27 ejected from the spout 9.

A 3D imaging device in the form of a stereo camera 29 is mounted on the spout 9 on the lower side thereof and at a distance from the outer end 23. The stereo camera 29 comprises two cameras, e.g. CCD cameras or video cameras, with objective lenses 36a and 36b, respectively, having a mean view direction 39 of the stereo camera 29. The two cameras are accommodated in a common housing 41.

The stereo camera is preferably a wide-angle camera with a large viewing angle β allowing the camera to "see" simultaneously the open top 19 and the nearest sidewall 17 of the crop-carrying container 14 of the transport wagon 11 as indicated in FIG. 1.

In the embodiment shown, apart from the joint providing for the rotation of the spout 9 around the vertical axis 21, the spout 9 does not comprise any joints between the body of the harvester 1 and the camera 29. Thus the position of the stereo camera 29, especially its height above the ground, is always known. It is envisaged that the spout in alternative embodiments comprises joints allowing the spout to be raised and lowered changing the overall geometry of the spout. In such embodiments gauges might be attached to the joints to allow establishment of the current geometry of the spout and thus of the height of the stereo camera's position above the ground.

The provision of the stereo camera 29 provides for obtaining monochrome (or even color) images as well as disparity images of the crop-carrying container. Thus the stereo camera 29 serves as a 3D sensor as well as an imaging device. The monochrome images may e.g. be transferred to a visual display unit in the form of a monitor 44 in the driver's cabin to enable or help the driver monitoring the process of transferring crop to the transport wagon 11 as it is known per se, while the disparity image is suited as an input for automatic or semi-automatic control.

Thus the forage harvester 1 comprises a data control system with a control device 46 with a data processor and a memory. The control device receives images or frames, i.e. data files comprising pixel information of the images, from the stereo camera 29 and process the images.

In the present embodiment the control device 46 uses prior art software to process the stereo images received from the stereo camera 29. Thus the control device 46 receives a stereo frame comprising a "left" and a "right" frame provided respectively by the two objective lenses 36a and 36b. It should be noted that "left" and "right" are used in relation to the two frames or pictures provided by the two objective lenses, as it is normal in relation to stereo vision, even though in the present embodiment the lenses are positioned one above the other rather than side by side. The control device 46 processes the stereo frame to provide a disparity picture, i.e. a picture comprising depth information i.e. 3D information. Normally the disparity picture is obtained analysing e.g. the left frame pixel by pixel, search for each pixel the corresponding pixel in the right frame and calculate the distance from the camera to the point imaged by those pixels by triangulation. Information of this distance is attached to the pixel of the left frame, which thus comprises the 3D information and constitutes the disparity picture. The disparity picture is processed by the control device 46 using prior art software to recognise and locate the transport wagon 11, especially the mainly horizontal rim 51 of the open top 19.

This requires a fairly good stereo picture without too much noise. Such pictures are frequently obtainable during operation, but also frequently they are not obtainable e.g. due to debris and dust flowing in the air around and below the spout 9.

If the control device 46 cannot with a sufficient degree of reliability recognise and locate the transport wagon on basis of a given frame it fails to establish the pose of the rim. Alternatively a pose of the rim may be established and the control device attaches information that the degree of reliability is low.

Having obtained a stereo frame or picture without too much noise and having therefrom established the pose of the rim 51 of the open top it is possible to maintain or adjust the position of the spout 9 to aim the crop stream ejected by the spout at the target i.e. the open top 19 to fill the container 14 of the transport wagon 11.

The transport wagon 11 comprises, as mentioned, two sidewalls i.e. a proximal sidewall 17 and a distal sidewall 18 relative to the harvester 1. Further the transport wagon 11, or its crop carrying container 14, comprises a front wall 20a and a rear wall 20b. Correspondingly the rim 51 comprises a proximal rim part 51a, a distal rim part 51b, a front rim part 51c and a rear rim part 51d.

Having established the pose of the rim 51 in a stereo picture the area of the picture between the proximal rim part 51a and the distal rim part 51b may be analysed pixel by pixel, and pixels which from the information of the disparity picture are adjudged to represent points situated mainly vertically below the distal rim part 51b are assigned to the distal sidewall 18.

The information of the stereo frame, i.e. the disparity picture, is stored in the memory of the control device 46 together with information about the pose of the rim 51. The pose of the rim is referenced to the harvester 1. Thus the pose, i.e. position and attitude, of the rim 51 and therewith the transport wagon 11 relative to the harvester 1 is established.

Due to the fact that the position or height of the stereo camera 29 above the ground is known, it is possible to filter out information relating to the ground, e.g. by eliminating any information relating to positions below 50 cm above the ground level. Elimination of information in this way reduces noise and data processing.

Having obtained and stored in this way information of a frame from which it has been possible to establish the pose of the rim 51 or at least a part of the rim comprising either the front rim part 51c or the rear rim part 51d together with adjacent parts of the proximal rim part 51a and the distal rim part 51b, this frame is denoted "reference frame".

Figure 4:
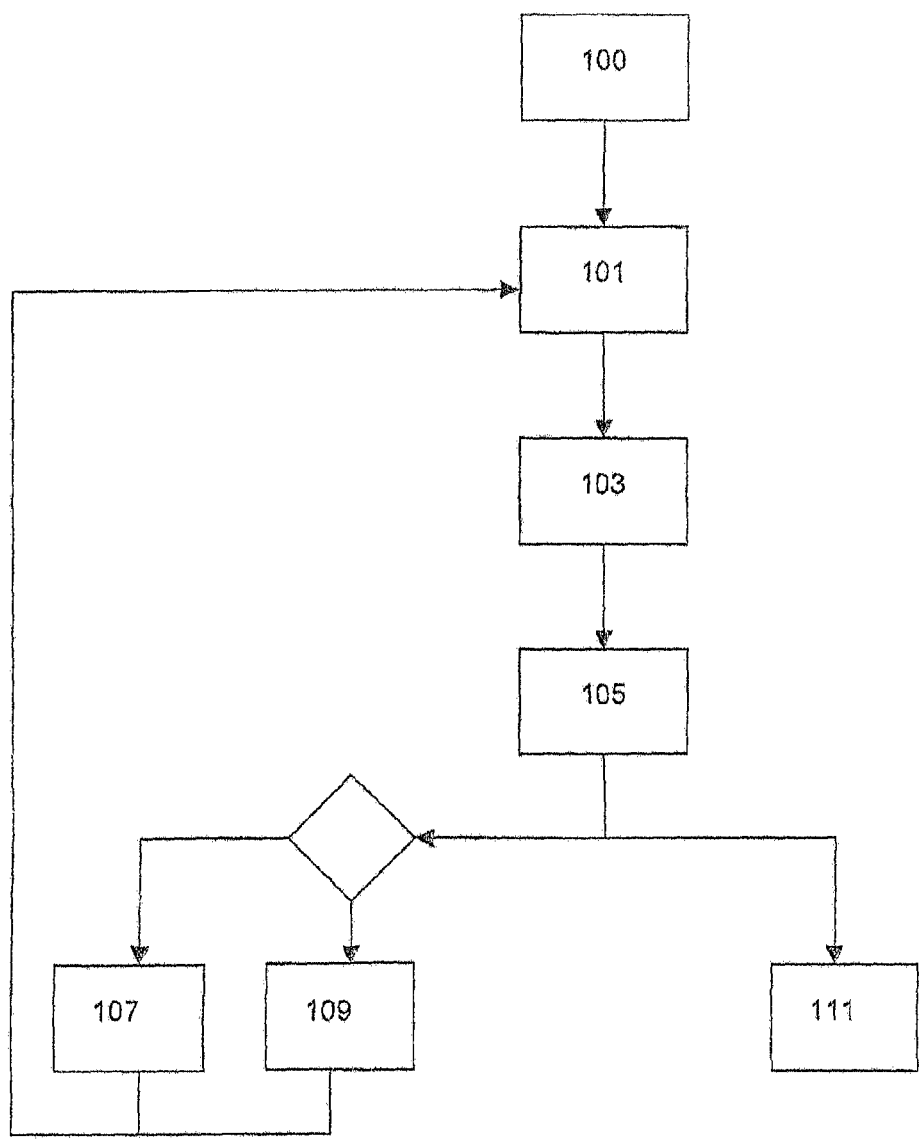
FIG. 4 shows a flow chart illustrating a method according to the invention.

Referring to FIG. 4 the system proceeds as follows having obtained a reference frame in an initial step 100. In a first step 101 characteristic points are identified in the reference frame. In a second step 103 a new stereo frame is obtained from the stereo camera 29 and the new stereo frame is analysed to seek and identify characteristic points or distinctive features in the new stereo frame.

In a third step 105 characteristic points found in the reference frame and the new stereo frame, respectively are matched to establish a group of characteristic points showing a common change of pose from the reference frame to the new stereo frame. The common change of pose thus found corresponds to the change of pose of the transport wagon 11 relative to the stereo camera 29 during the time span between obtaining the reference frame and the new stereo frame.

If the quality of the new stereo frame is not sufficient to establish the pose of the rim 51 or part thereof as explained above then in a fourth step 107 the pose of the rim 51 registered together with the information of the reference frame is updated by the common change of pose as a new pose, and the control device 46 may provide any control signal appropriate to keep the crop stream ejected by the spout 9 aimed at the target, i.e. the open top 19 or a determined place within the open top 19.

If the quality of the new stereo frame is sufficient to determine the pose of the rim 51 or part thereof, the new stereo frame is in an alternative fourth step 109 used as a new reference frame.

Figure 2:
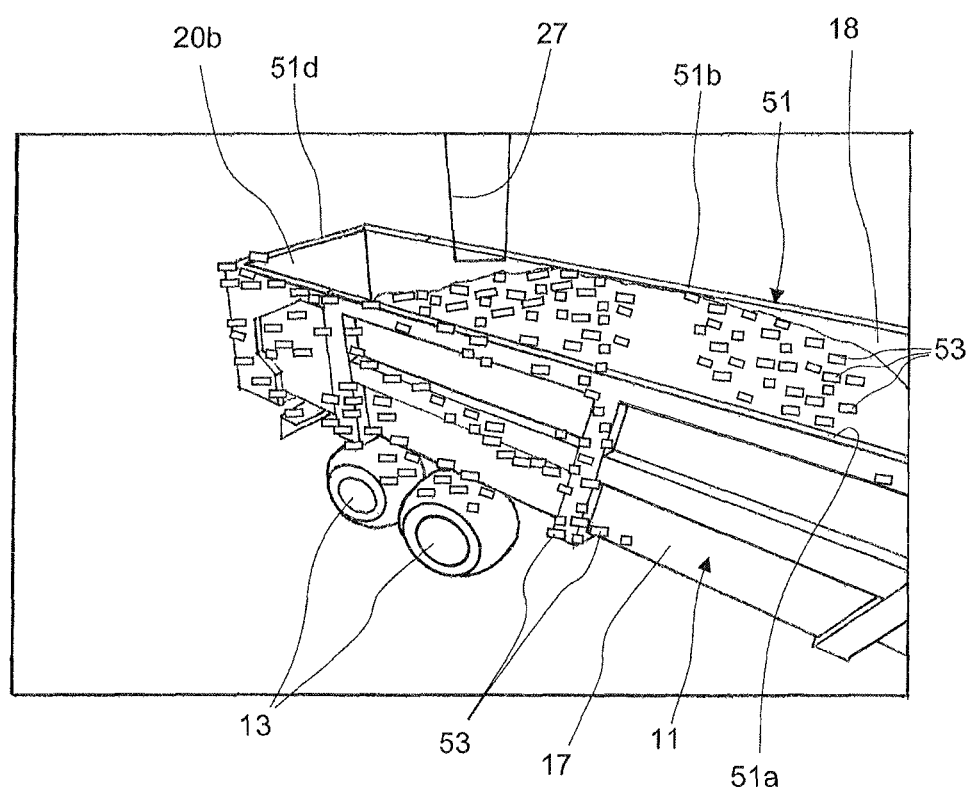
FIG. 2 shows an image of the transport wagon.

FIG. 2 shows a picture of a transport wagon 11 wherein characteristic points found in said picture and a subsequent new picture are indicated as lines 53 extending between pairs of matched characteristic points. It is seen that no points are found on the surrounding ground, which has been filtered out as mentioned above. The crop stream 27 entering the container of the transport wagon 11 is seen and it is noticed that no matched characteristic points are found in the crop stream 27 or at its place of impact inside the transport wagon 11. This is due to the fact that around the crop stream 27 dusty conditions are present creating noise and the surface of the crop deposited in the transport wagon 11 is kind of vivid or mobile in the area of impact of the crop stream due to the continuous arrival of crop. These conditions make it impossible to determine the actual position of the surface of the crop deposited in the transport wagon 11 based on a single 3D image because for a given point or pixel found in the 3D image it is not possible to determine whether the point actually belongs to the surface of deposited crop or whether it belongs to the flowing crop stream 27. However next to the place of impact of the crop stream the surface will locally be at rest during the time span between obtaining two subsequent frames and thus it is possible to identify and match characteristic points of the surface of the deposited goods. These points reliably indicate the current surface of the deposited crop, thus providing for determining the degree of filling of the container of the transport wagon 11.

As mentioned above pixels positioned between the distal and the proximal rim parts 51b and 51a are analysed to be possibly assigned to the distal side wall 18. Identified and matched characteristic points positioned between the distal and the proximal rim parts 51b and 51a are assigned to the surface of deposited crop if they are not assigned to the distal side wall 19.

In a fifth step 111 (FIG. 4) a signal is sent to the monitor 44 as information for the driver or operator of the harvester 1 about the filling degree, i.e. the residual filling potential of the container 14.

Referring to FIG. 1 it is noted that by means of the stereo camera 29 the surface of crop deposited in the container 14 may be viewed. Thus for different stages of filling different surfaces 55a, 55b, 55c, 55d, 55e of the crop are shown. However with the configuration of the spout 9 and the stereo camera 29, and the height above the ground of the top 19 of the container 14 shown in FIG. 1, the surface 55a of the crop will not be visible to the stereo camera 29 before it reaches a certain height. When the surface 55a of the crop is below that certain height, and somewhat above it as indicated by surface 55b, the residual filling potential, i.e. the free space, of the container at a given section, may be characterised as "large", i.e. for quite a while there will be no risk of overfilling.

The degree of filling or residual filling potential or capacity may be evaluated in various ways. Since the height of the stereo camera 29 above the ground is known, the height h above the ground of an apex 55' of the surface of the crop in the container may be evaluated relative to the height of the rim 51 of the container. Based on knowledge or assumption about the filling speed for a given container, a given harvester and a given crop, the residual filling potential may be categorized e.g. according to expected residual time before reaching a state "full".

The state "full" would be when a certain level of the surface 55 of the crop is reached, which could either be when the container thus filled has reached, or is expected to have reached, a predetermined weight, or it could be when a risk occurs that crop will spill over the rim 51. In the state "full" the residual filling potential will be categorized "none".

The state "full" as thus the limit of the filling potential is predetermined taking into account parameters as allowable weight, allowable filling height i.e. whether the crop is allowed, either overall as a mean, to extend above the rim of the open top, etc.

As shown in FIG. 1 when the crop has reached a level indicated by surface 55c the residual filling potential might be categorized "small". The transition from surface 55b (category "large") to surface 55c (category "small") could be divided into further categories to provide convenient information for the driver or operator.

As further shown in FIG. 1 by surface 55d residual filling potential could be categorized "none" when the crop hides the distal rim part 51b from the stereo camera 29. Further a category "overfilled" might be reached when the difference between the distances of the proximal rim part 51a and the surface 55e from the stereo camera 29 approach zero.

Figure 3:
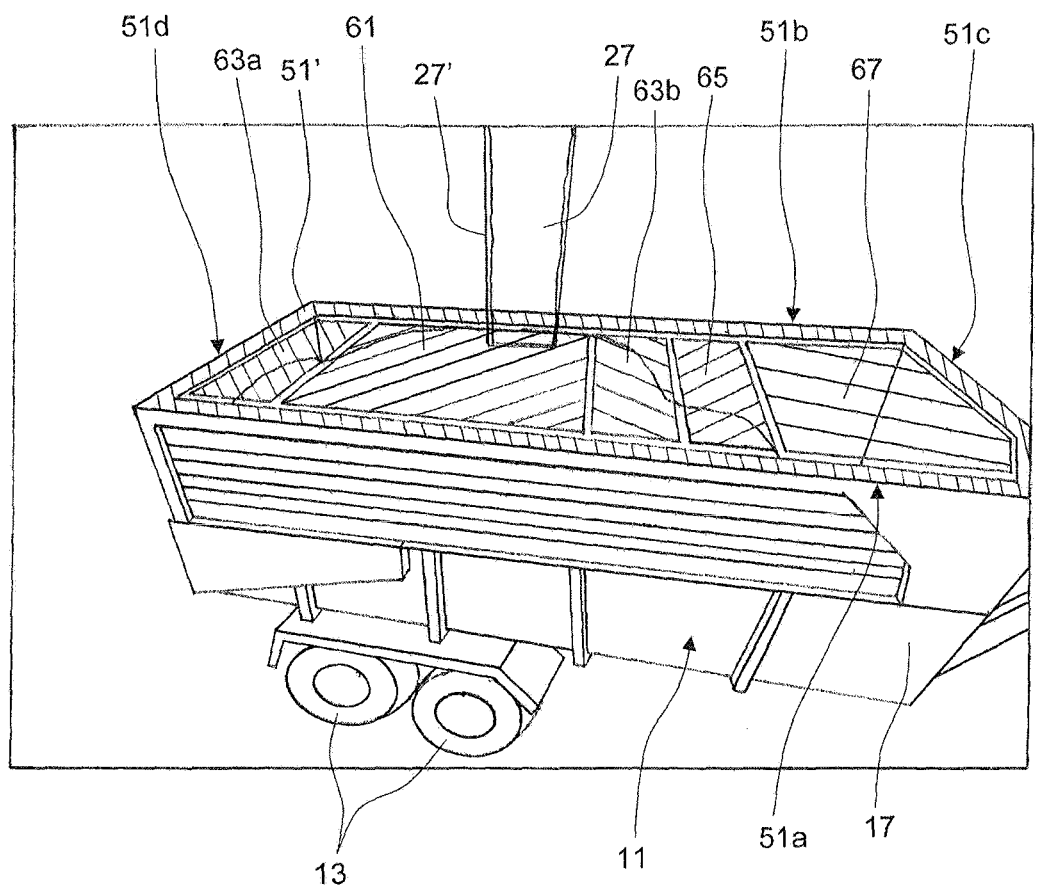
FIG. 3 shows another image of the transport wagon illustrating a first embodiment of the present invention,
FIG. 3a an image similar to FIG. 3, but illustrating a second embodiment of the present invention,
FIG. 3b an imagine similar to FIG. 3, but illustrating a third embodiment of the present invention.

FIG. 3 shows a monitor picture of a transport wagon 11 in which the rim 51 as a visual display has been indicated by means of signals provided by the control device 46 recognising and locating the rim using appropriate software. The indication of the rim has the form of a picture frame 51' generated by the control device 46 and is superposed the picture provided from the camera i.e. one of the two objectives 36a and 36b. Further the degree of filling is indicated gradually for various longitudinal sections of the transport wagon 11 by picture fields 61, 63a, 63b, 65 and 67 generated by the control device 46 as visual display and superposed the picture provided from the camera. This indication of the degree of filling or residual filling potential tells which parts of the container of the transport wagon has been sufficiently filled and which parts still have room for more crop.

The picture frame 51' and the picture fields 61, 63a, 63b, 65 and 67 are hatched to indicate that they are given different colors. Thus the picture frame 51' is given a green color to enhance its visibility and to indicate that it has been reliably recognised and its position has been reliably established. If this was not the case it would have been given another color e.g. yellow. Colors are used to indicate various degrees of filling of different areas of the container, e.g. indicating by a red color that an area has been filled and has been assigned the residual filling potential category "none" (field 61), indicating by a green color areas that are far from filled and have been assigned the residual filling potential category "large" (field 67), and indicating by one or more yellow nuances areas, which are close to being filled (field 63a, 63b and 65); thus the picture fields 63a and 63b has been given a relatively dark yellow color to indicate that the areas below of the container, as a mean across the width of the container, have been assigned the residual filling potential category "small", whereas the picture field 65 has been giver a more pale yellow color to indicate that the area below of the container, as a mean across the width of the container, has been assigned a residual filling potential category "approaching small". Apart from the color given to a picture field the density of the color or transparency of the picture field might be adjusted to indicate, or further indicate, the residual filling potential. Thus rather that a dark yellow and a pale yellow, a more and less dense yellow, respectively might be used. Further, picture fields indicating a small residual filling potential might have less transparency than picture fields indicating a large residual filling potential, or vice versa.

Further to the categories indicated in FIG. 3 the category "overfilled" mentioned above might be given a special color e.g. black.

The picture fields 61, 63a, 63b, 65 and 67 are in the present embodiment provided as bands extending across the width of the container 14 and indicating mean values for their respective cross sections of the container 14. The width of the respective bands, i.e. their extension in the longitudinal or driving direction of the transport wagon 11 carrying the container 14 (approximately left to right in FIG. 3), are floating and determined by the surface of the crop below, i.e. by the positions of cross sections where the surface of the crop intersect predetermined levels indicating boundaries between the different predetermined categories of the residual filling potential.

In FIG. 3 apart from picture frame 51' and the picture fields 61, 63a, 63b, 65 and 67, also an outline 27' is provided by the control device 46 to indicate the position of the stream of crop 27 calculated on basis of the position of the spout 9.

By watching the colored picture fields 61, 63a, 63b, 65 and 67, how initially one single green picture field will be present, in which first a pale yellow picture field will emerge, in which later a darker yellow picture field will emerge, in which later yet a red picture field will emerge, and how the emerging picture fields will apparently float towards the front and/or the rear rim parts 51c, 51d, the driver will readily have a clear impression of the progress of the filling process, the stereo camera 29, the control device 46 and the monitor 44 working together as a filling degree gauge.

Figure 3A:
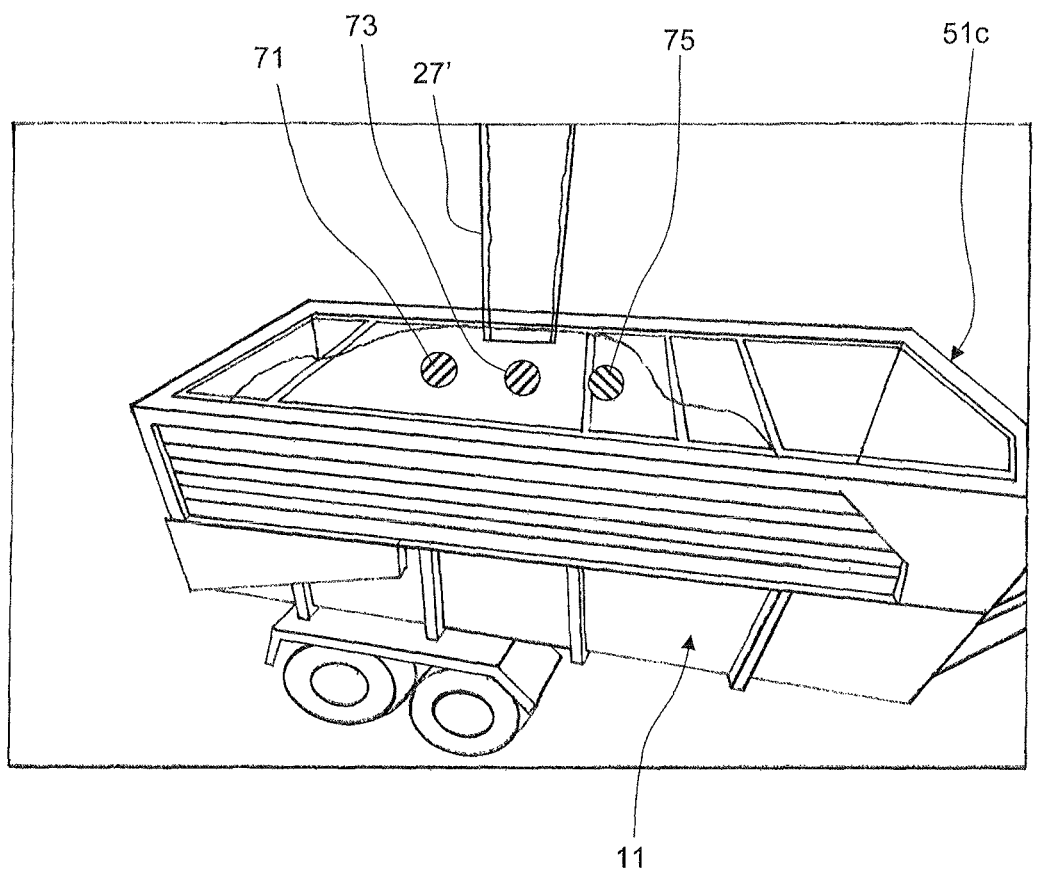

In FIG. 3a an alternative visual display indicating residual filling potential is shown. Three colored dots 71, 73 and 75 are in fixed positions relative to the outline 27' of the crop stream. Since the stereo camera 29 is fixed relative to the spout 9, and since the outline 27' reflects the position of the spout 9, the local areas for which the visual display, i.e. the dots 71, 73 and 75, indicate the residual filling potential are in this embodiment fixed relative to the 3D sensor, i.e. the stereo camera 29. The dots are given colors according to the residual filling potential of the cross section of the container below the respective dot. Thus dots 71 and 73 are in the present situation given the color red, like the picture field 61 in FIG. 3, and the dot 75 is given a dark yellow color, like the picture field 63b in FIG. 3. This distribution of colors between the dots indicates that in the present situation the discharge spout 9 should be moved towards the front rim part 51c of the container since apparently the cross section of the container below the spout 9, represented by dot 73, and the cross section of the container behind or to the left of the spout, represented by dot 71, are filled.

Figure 3B:
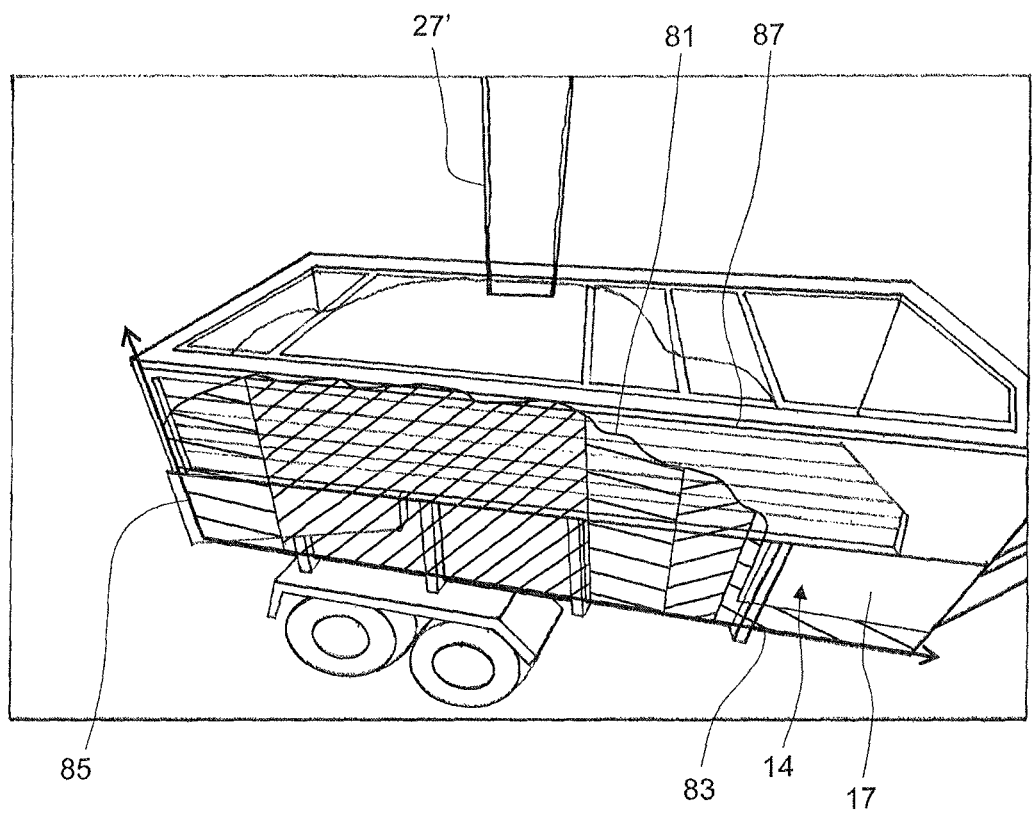

FIG. 3b shows other supplementary or alternative embodiments of visual display according to the present invention. Whereas in FIGS. 3 and 3a visual displays have been superposed the image of the open top 19 of the container 14, which does affect the visibility of the crop deposited in the container, in FIG. 3b a visual display is superposed the image of the proximal sidewall 17. This visual display is provided as a 2D graph 81 in a coordinate system in which the abscissa 83 represents the length of the container 14 and the ordinate 85 represents the mean filling level of the corresponding cross section of the container 14. Since the coordinate system is fitted to the proximal sidewall 17, a given point of the 2D graph reflects the mean filling level on the opposite side of the proximal sidewall 17 right behind the point of the graph. A level "full" 87 is indicated in the coordinate system. The distance from the level "full" 87 down to the 2D graph 81 immediately indicates the residual filling potential for a given cross section of the container.

In this embodiment, since the filling level and thus the residual filling potential is indicated by the continuous 2D graph 81, the current one of an infinite number of different levels for the residual filling potential is indicated for each cross section of the container.

To further facilitate the recognition of the current residual filling potential for a given cross section of the container 14 or a given band across the container 14 the area below the 2D graph 81 in the coordinate system can be colored in a manner corresponding to the coloring of the picture fields 61, 63a, 63b, 65 and 67 in FIG. 3, as indicated in FIG. 3b. In this case the boundaries between areas colored respectively red, yellow (dark and pale) and green might be floating as the case is in the embodiment of FIG. 3. Alternatively the 2D graph might be represented by a histogram, each bin of which represents a given band across the width of the container 14 and each bin of which rises to a height indicating the mean filling level of that band, and wherein each bin might be given a color indicating the mean residual filling potential of the band across the container, that it represents.

Referring again to FIG. 4, subsequently to the fourth and fifth steps the method returns to the first step 101 using the information of the up-dated reference frame.

Identifying characteristic points in the first step 101 and the second step 103 may be performed by any known method e.g. by any known method of so-called "Blob detection" or any known method of so-called "Corner detection". These methods provide a response for a pixel or small group of pixels centred around a pixel. A pixel having a response, but for which another pixel having a more pronounced response is found in its local neighbourhood, is rejected since weak responses are likely to cause noise.

Matching of characteristic points in the third step 105 may be performed on basis of texture analysis of the vicinity of the respective points or features. Such analysis is made by means of a so-called "Feature descriptor", of which several are known in the art, e.g. Zero-mean Normal Cross Correlation, the SURF (Speeded Up Robust Features) descriptor and the SIFT (Scale-invariant feature transform) descriptor.

When matching a characteristic point found in the new stereo frame with a characteristic point in the reference frame, then the search for a possible match may be restricted to an area, where the correct match is expected to be found. Thus areas which are expected not to relate to the transport wagon 11, but its surroundings e.g. on an external side the front rim part, may be excluded.

Determining the Common Change of Pose:

The stereo camera 29's and the transport wagon 11's mutual change of pose during the time between one frame (the reference frame) and another frame (the new stereo frame) is described by a transformation matrix M:

$$M = \begin{pmatrix} R & T \\ 0 \ 0 \ 0 & 1 \end{pmatrix}$$

where
R is a 3 by 3 matrix (3 rows and 3 columns) expressing the rotation about three spatial axes, and
T is a 3 by 1 matrix defining the translation in three spatial directions;
M is thus a 4 by 4 matrix.
If $P_a$ designates the reference frame of a time a and $P_b$ designates the new stereo frame of a later time b, i.e. a<b, then
$P_b = M_{ab} * P_a$, where $M_{ab}$ is a matrix expressing the transformation from a to b.
Cf. the third step 105 mentioned above, M is in an embodiment of the present invention established by a RANSAC method:
If $f_{as}$ is characteristic point No. s in $P_a$, which have been matched with $f_{bs}$, which is characteristic point No. s in $P_b$, and correspondingly $f_{at}$ is characteristic point No. t in $P_a$, which have been matched with $f_{bt}$, which is characteristic point No. t in $P_b$, and $f_{au}$ is characteristic point No. u in $P_a$, which have been matched with $f_{bu}$, which is characteristic point No. u in $P_b$, and if $f_s$, $f_t$ and $f_u$ are non-collinear, then $$f_{bs} = M_{ab} * f_{as}$$
$$f_{bt} = M_{ab} * f_{at}, \quad f = \begin{pmatrix} x \\ y \\ z \\ 1 \end{pmatrix}, \text{ where } x, y, z \text{ are the spatial coordinates of } f$$
$$f_{bu} = M_{ab} * f_{au}$$

constitutes an equation system from which $M_{ab}$ can be calculated.

$M_{ab}$ is according to a RANSAC method calculated as estimate a large number of times for randomly selected three matched pairs of characteristic points $f_a$ and $f_b$. Once an estimate of $M_{ab}$ is thus calculated it is tested against the other matched pairs of characteristic points in $P_a$ and $P_b$. Here through a best estimate of $M_{ab}$ is established. Matched pairs of characteristic points, which according to the best estimate of $M_{ab}$ appear to be mis-matches, are rejected as outliers.

By the present invention several advantageous effect may be obtained:

In periods when images obtained by the stereo camera 29 are of a poor quality it is still possible to keep track off the mutual position of the stereo camera (and thus the harvester) and a target area i.e. the transport wagon.

It is possible reliable to detect the current surface of a material in the target area i.e. of crop in the transport wagon and thus the degree of filling (of the wagon) or the residual filling potential.

Further due to the fact that the pose of the rim or part thereof is established and information is stored, at least in a preferred embodiment, it is possible to keep track of either end of the container of the wagon i.e. the front rim part 51c and the rear rim part 51d, once the respective rim part has been within the view of the camera 29, even if the entire rim 51 is not within the view of the camera, i.e. is not represented in a given stereo frame, at any time.

It will be understood that each of the elements described above, or two or more together, may also find a useful application in other types of constructions differing from the types described above.

While the invention has been illustrated and described as embodied in a filling degree gauge, agricultural vehicle with the gague, and method of measuring and displaying residual filling potential of a target area, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A filling degree gauge for measuring and displaying a residual filling potential of a target area being filled through a target with goods by a goods carrier of an agricultural vehicle, the filling degree gauge comprising:
   a 3D imaging device for observing at least a part of the target area including at least a part of the target;
   a data control system arranged for receiving images of the observed part of the target area from the 3D imaging device; and
   a visual display unit;
   wherein said data control system operates to provide on the visual display unit a first visual display indicating a residual filling potential by indicating a current one of at least three different levels of the residual filling potential.

2. A filling degree gauge as defined in claim 1, wherein said data control system operates to provide on the visual display unit a second visual display indicating a local residual filling potential for at least two local areas.

3. A filling degree gauge as defined in claim 2, wherein the data control system provides in the visual display unit the second visual display indicating the local residual filling potential of the at least two local areas which are fixed relative to the 3D sensor.

4. A filling degree gauge as defined in claim 2, wherein the data control system provides in the visual display unit the second visual display indicating the local residual filling potential of the at least two local areas which are fixed relative to the target area.

5. A filling degree gauge as defined in claim 2, wherein the local areas and boundaries thereof are floating in dependence on levels of the residual filling potential.

6. A filling degree gauge as defined in claim 1, wherein said data control system operates to provide on the visual display unit the first visual display indicating different levels of residual filling potential by different colors.

7. A filling degree gauge as defined in claim 1, wherein said data control system operates to provide on the visual display unit the first visual display in which for a given local area, a color indicating a level of the residual filling potential is changed, when the level of the residual filling potential changes for that local area.

8. A filling degree gauge as defined in claim 1, wherein said data control system operates to provide on the visual display unit the first visual display indicating a local residual filling potential as a 2D graph.

9. A filling degree gauge as defined in claim 8, wherein said data control system operates to provide on the visual display unit the first visual display indicating said 2D graph in a 2D coordinate system in which one axis represents a position in the target area and another axis represents a filling degree.

10. A filling degree gauge as defined in claim 1, wherein said data control system operates to provide on the visual display unit a third visual display indicating at least a part of the target area and a level of the residual filling potential of local areas within said part of the target area.

11. A filling degree gauge as defined in claim 10, wherein said data control system operates to provide on the visual display unit the third visual display indicating at least a part of the target area and the level of the residual filling potential of local areas within said part of the target area by indicating a mean local residual filling potential for parallel bands of the target area.

12. A filling degree gauge as defined in claim 1, wherein said data control system operates to display an image provided by said 3D imaging device on the visual display unit together with the first visual display indicating the residual filling potential.

13. A filling degree gauge as defined in claim 12, wherein one of the displayed image and the first visual display indicating the residual filling potential is superposed on the other.

14. A filling degree gauge as defined in claim 13, wherein the superposed displayed image or first visual display is transparent.

15. A filling degree gauge as defined in claim 14, wherein said superposed displayed image or first visual display has an adjustable transparency to indicate the residual filling potential.

16. A filling degree gauge as defined in claim 1, wherein the agricultural machine is a forage harvester and wherein the filing degree gauge measures and displays the residual filling potential of the target area through the target with goods by the goods carrier, which is a discharge spout of the forage harvester.

17. A filling degree gauge as defined in claim 1, wherein the 3D imaging device is a stereo camera comprising two CCD cameras.

18. An agricultural vehicle, comprising a goods carrier for conveying goods to a target area; and a filling degree gauge as defined in claim 1.

19. A method for measuring and displaying a residual filling potential of a target area being filled through a target with goods by a goods carrier of an agricultural machine, the method comprising the steps of:
 observing by a gauge comprising a 3D imaging device at least a part of the target area including at least a part of the target; and
 providing, by a data control system configured to receive images from the 3D imaging device, on a visual display unit, a visual display indicating the residual filling potential of the target area being filled by indicating a current one of at least three different levels of the residual filling potential.

20. A method for measuring and displaying as defined in claim 19, wherein the 3D imaging device used in the step of observing is a stereo camera comprising two CCD cameras.

* * * * *